United States Patent Office 2,838,031
Patented June 10, 1958

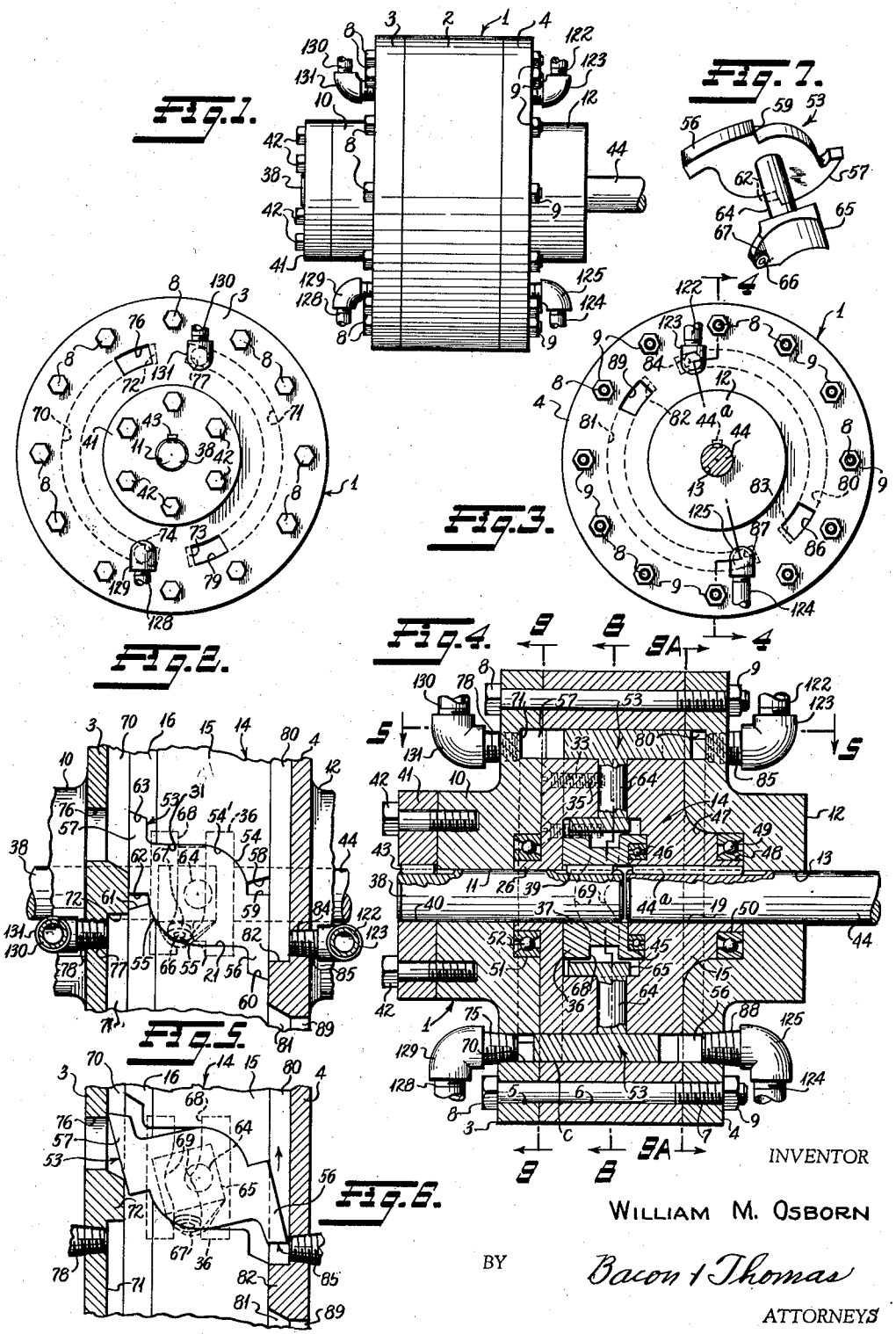

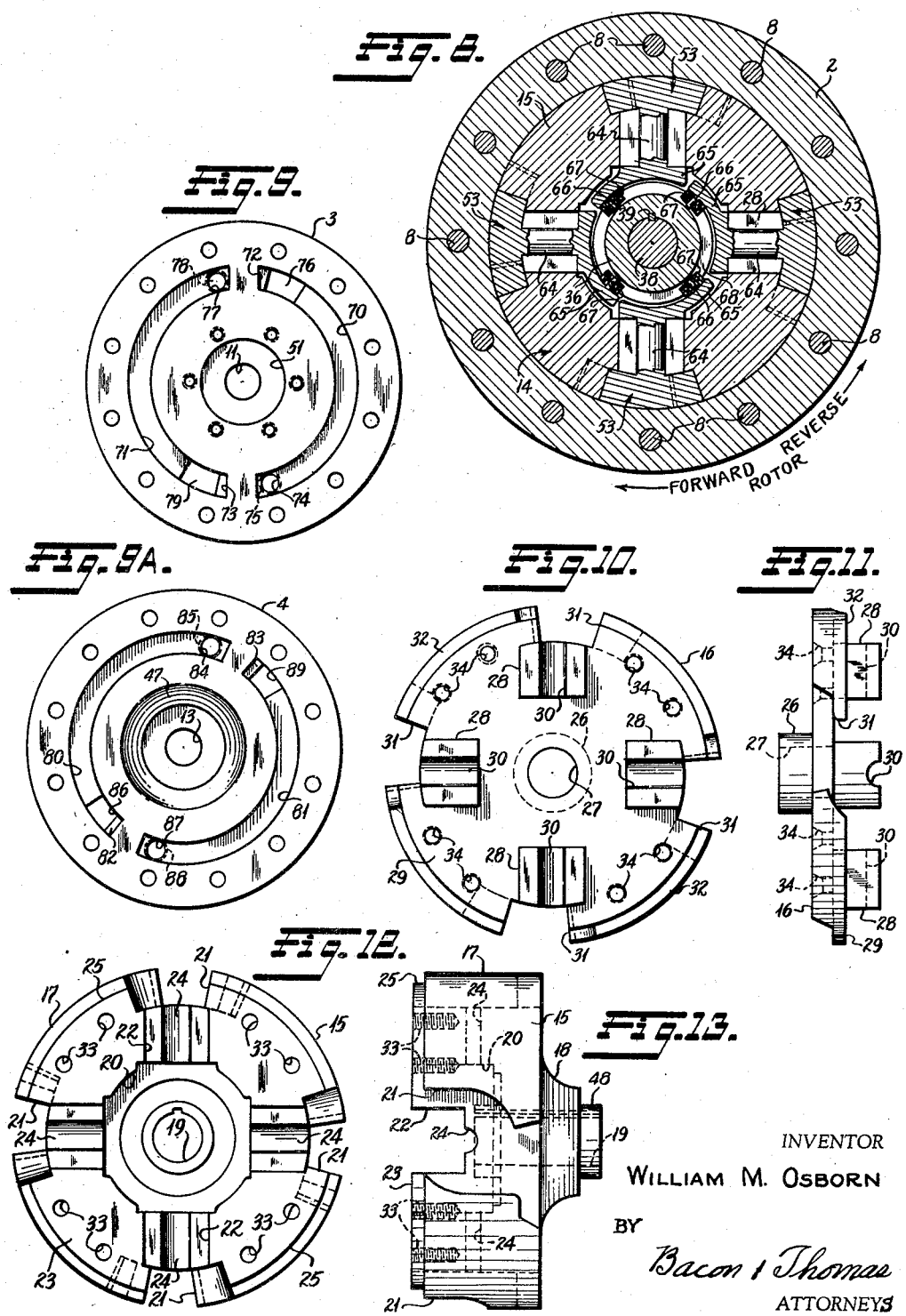

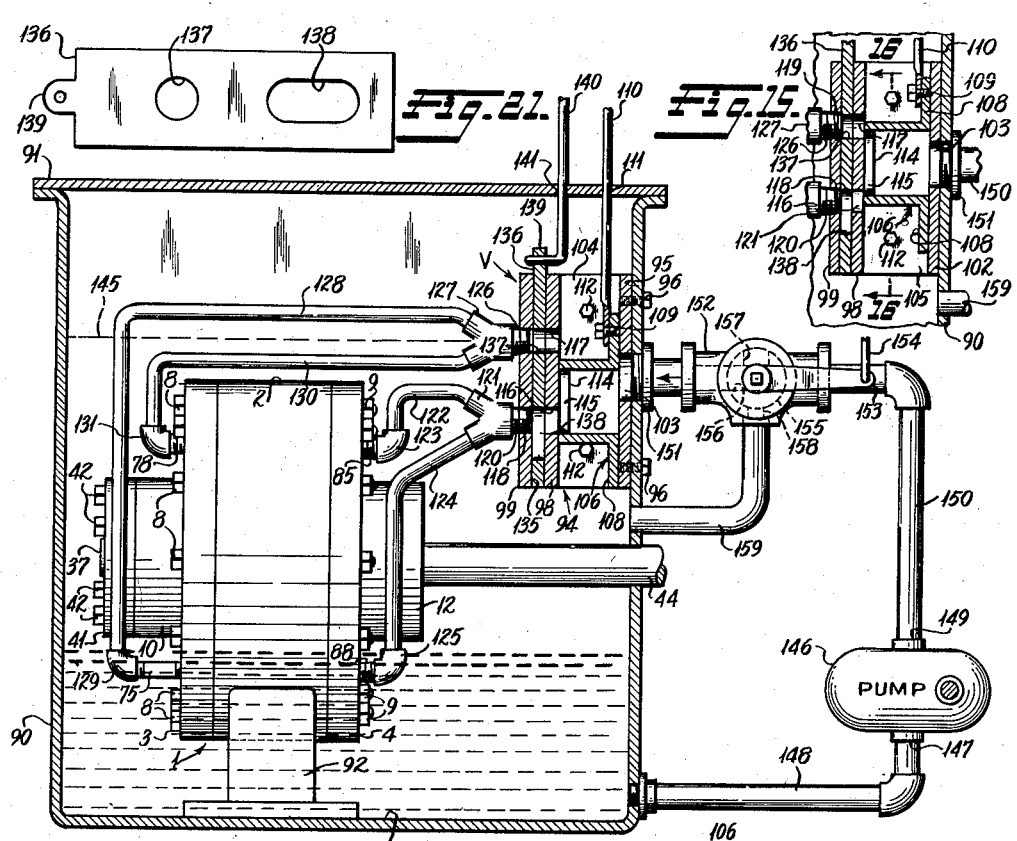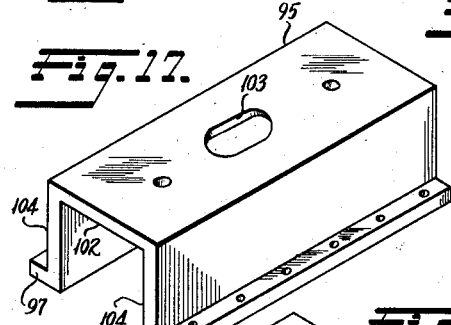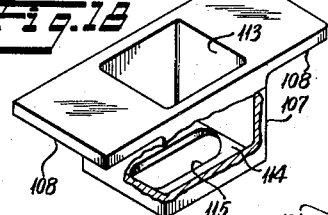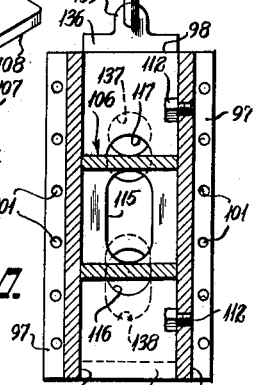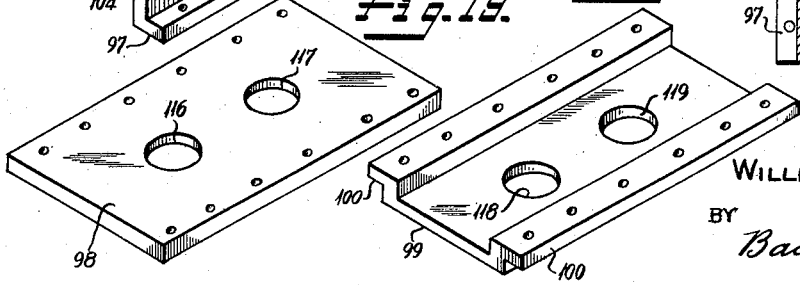

2,838,031

HYDRAULICALLY OPERATED MOTOR AND MEANS FOR CONTROLLING THE SAME

William M. Osborn, Denver, Colo.

Application April 16, 1954, Serial No. 423,726

12 Claims. (Cl. 121—93)

The present invention relates to an improved hydraulically operated unit adapted for various uses, such as a positive power transmiting means, a brake, an infinitely variable speed motor, a combined transmission and brake, etc.

More specifically, the invention relates to a device of the character referred to above which is highly efficient, has a minimum number of parts, operates substantially free of friction and is substantially unaffected in its operation by centrifugal force.

The invention further relates to a high speed hydraulic-power transmitting system for motor vehicles, tractors and the like and to control means for such system, including a novel valve construction adapted to be actuated to prevent "creep" of the vehicle and also to effect a braking action on the vehicle, when desired.

The principal object of the invention is to provide a hydraulically operated device of the character described, which, when used as a power transmitting unit or as a motor, can be selectively driven either in a forward or in a reverse direction.

Another object is to provide a hydraulically operated unit of the character described, which includes very few parts of relatively simple construction that can be manufactured on a mass production basis.

Another object is to provide a hydraulically operated device including a rotor provided with pivoted blades or vanes whose position remains unaffected by centrifugal force, irrespective of the speed of rotation of the rotor, and wherein the blades or vanes are mechanically controlled at all times to assure a positive drive of the device in either a forward or reverse direction.

Another object is to provide a hydraulically operated device wherein the necessity for employing packing means between the stationary housing and rotating parts is eliminated without any substantial loss in efficiency, notwithstanding the fact that the housing may be caused to expand slightly by the pressure of the operating fluid.

A more specific object is to provide a power transmitting system including a hydraulically operated unit adapted to be used in a motor vehicle in lieu of a conventional gear, fluid coupling, or torque converter type of transmission. In this connection, the present unit is such that it will not cause the vehicle to "creep" when it should remain motionless, which is a common fault of the latter two types of transmissions.

Still another object is to provide a hydraulic transmission system for a motor vehicle in which the driving unit is constructed and associated with control means in such manner that the unit can be caused to act as a brake for the vehicle to thereby reduce the wear on the conventional brake parts.

A further object is to provide a rotor for use in a hydraulically operated device, such as disclosed herein, which includes gate members each having a set of blades or vanes that are controlled by a single cam groove or track for effecting forward and reverse drive of the rotor.

Other objects and features of the invention will be apparent from the following description taken in conjunction with the accompanying drawings, in which:

Fig. 1 is an elevational view of the exterior of the power transmitting unit;

Fig. 2 is a left side elevational view of the unit shown in Fig. 1;

Fig. 3 is a right side elevational view of the unit shown in Fig. 1;

Fig. 4 is a vertical sectional view through the transmission unit taken on the line 4—4 of Fig. 3;

Fig. 5 is a fragmentary sectional view taken on the line 5—5 of Fig. 4 and illustrating one of the gates with its set of blades in a retracted position;

Fig. 6 is a view similar to Fig. 5 but illustrating the blades in an active position;

Fig. 7 is a perspective view of one of the gate member assemblies;

Fig. 8 is a vertical sectional view taken on the line 8—8 of Fig. 4;

Fig. 9 is an elevational view showing the working chambers formed in the inner face of one of the end plates of the housing, as viewed on the line 9—9 of Fig. 4;

Fig. 9A is an elevational view showing the working chambers in the inner face of the other end plates of the housing, as viewed on the line 9A—9A of Fig. 4;

Fig. 10 is an elevational view illustrating the details of the inner face of one of the disc elements comprising the rotor;

Fig. 11 is an elevational view of the rotor element shown in Fig. 10;

Fig. 12 is a view illustrating the details of the inner face of the other disc element of the rotor;

Fig. 13 is an end elevational view of the rotor element shown in Fig. 12;

Fig. 14 is a diagrammatic view partly in section illustrating the power transmitting unit of Fig. 1 connected in a system adapting the same to serve as a transmission for a motor vehicle;

Fig. 15 is a fragmentary vertical sectional view through the valve for controlling forward and reverse speeds, etc., of the unit, but illustrates one of the moveable valve elements in its intermediate position;

Fig. 16 is a sectional view taken on the line 16—16 of Fig. 15;

Fig. 17 is a perspective view of one of the housing elements of the control valve;

Fig. 18 is a perspective view of one of the slidable elements of the control valve;

Fig. 19 is a perspective view of a plate constituting an intermediate housing portion of the control valve;

Fig. 20 is a perspective view of an end housing member of the control valve; and Fig. 21 is a plane view of a second sliding element embodied in the control valve.

Referring now to Figs. 1 to 4 of the drawings, the hydraulic drive unit is generally identified by the numeral 1 and comprises a housing including a central cylindrical or annular housing section 2 and end housing plates or sections 3 and 4. The end plates 3 and 4 have inner faces that are machined or ground smooth and these engage with similar smooth surfaces at the opposite ends of the central section 2. The end plate 3 is provided with a series of openings 5 and the central member 2 and the other end plate 4 are provided with similar registering openings 6 and 7, respectively. A plurality of bolts 8 extend through the openings 5, 6 and 7, and nuts 9 are threaded on the ends of the bolts to secure the central member 2 and the end plates 3 and 4 in assembled relation. It is to be understood that the engaging faces of the central member 2 and the end plates 3 and 4 are so smooth and are pulled up so tightly that no packing or sealing means need be disposed therebetween.

The end plate 3 may be made of any suitable material but is preferably made of bronze and has a hub portion 10 extending outwardly therefrom and provided with an opening 11. The end plate 4 is also preferably made of bronze and is provided with a similar hub portion 12 having a similar opening 13. The end plates 3 and 4 and the central housing section 2 cooperate to form a chamber C for a rotor generally identified by the numeral 14. The rotor parts may also be made of any suitable metal. The rotor 14 is adapted to be mounted in close-fitting concentric relation with the annular housing section 2 and to occupy the entire width of the chamber C between the end plates 3 and 4.

The rotor 14 comprises two main disc-like sections 15 and 16, the details of which are best illustrated in Figs. 10 to 13. The rotor section 15 is hollow and has a peripheral portion 17 of an outside diameter of only a few thousandths of an inch less than the inside diameter of the annular section 2. In other words, the clearance between the rotor section 15 and the housing section 2 is only sufficient to maintain a lubricating oil film therebetween. The rotor section 15 has a hub portion 18 provided with a central opening 19 which extends completely through said hub portion and opens into a relatively large, generally octagonal chamber 20. The rotor section 15 also has four gate receiving recesses 21 formed in the periphery thereof and spaced 90° apart. A notch 22 extending inwardly from the inner face 23 of the rotor section 15 is associated with each of the recesses 21. Each of the notches 22 has a substantially semi-circular cavity 24 formed in the bottom wall thereof. The notches 22 also merge with the central chamber 20. A shoulder 25 is formed at the outer edge of the inner face 23.

The rotor section 16 is platelike and has a hub portion 26 provided with an opening 27. A plurality of cube-like bosses 28, complemental in shape to that of the notches 22, project from the inner face 29 of the rotor section 15. These bosses have semicircular cavities 30 that are complemental to the cavities 24 and when the rotor sections 15 and 16 are assembled in confronting relation, the bosses 28 extend into the notches 22 and the cavities 24 and 30 cooperate to form a circular bore for a purpose that will be explained later. The rotor section 16 has peripheral recesses 31 adjacent the bosses 28 and these cooperate with the recesses 21 in the rotor section 15 for a purpose which will also be explained later. The rotor section 16 also has a laterally projecting flange 32 extending therefrom between adjacent recesses 31 and these are adapted to seat upon the shoulder 25 of the rotor section 15 to maintain the rotor sections 15 and 16 in concentric relation. A plurality of threaded holes 33 extend into the rotor section 15 from the face 23 and the rotor section 16 has a corresponding number of countersunk holes 34 that register with the holes 33 and a plurality of screws 35 extend through the openings 34 and into the openings 33 and secure the rotor sections 15 and 16 together.

The rotor section 16 forms an end wall for the chamber 20 and a cylindrical cam 36 is disposed in said chamber. The cam 36 has an opening 37 to receive one end of a shaft 38 and a conventional key 39 secures the cam 36 to said shaft. The shaft 38 extends through the opening 11 in the housing section 3 and projects beyond the hub portion 10 thereof into an opening 40 in a plate 41 mounted upon the hub portion 10 by means of screws 42. The plate 41 and the shaft 38 have cooperating keyways in which a key 43 is mounted to prevent rotation of the shaft 38 relative to the housing section 3.

A driven shaft 44 extends through the opening 13 in the hub 12 of the housing section 4 and through the opening 19 in the rotor section 15 and projects into the opening 37 in the cam 36. The cam 36 has a shouldered recess 45 in which the outer race of a ball bearing 46 is mounted, the inner race of which is engaged with and serves as an internal support for the rotor 14. The shaft 44 is secured to the rotor section 15 by a conventional key 44a.

The hub portion 18 of the rotor section 15 is defined by an arcuate surface that engages with a complemental surface 47 formed in the inner face of the housing 4. The surface 47 merges into a recess 48 containing a ball thrust bearing 49. The hub portion 18 is reduced in diameter as indicated at 50 to receive the inner race of the ball bearing 49. On the other hand, the housing section 3 has a recess 51 in which a similar ball thrust bearing 52 is mounted. The inner race of the ball bearing 52 receives the hub portion 26 of the rotor section 16. Thus, the rotor 14 is supported for friction-free rotation relative to the housing 2, 3, 4 by the ball thrust bearings 49 and 52. These bearings also take up all axial thrust of the rotor with respect to the housing. It will also be apparent that the cam 36 is maintained stationary relative to the housing by virtue of the fact that it is secured to the shaft 38 by the key 39 and the shaft 38 is, in turn, held against rotation by being secured to the plate 41 by the key 43.

As is best shown in Figs. 5 and 6, the peripheral recesses 21 and 31 in the assembled rotor sections 15 and 16 cooperate to form single recesses for the reception of individual gate members generally identified by the numeral 53. Each gate member 53 includes arcuate side portions 54 and 55 that are in close proximity to complemental arcuate portions 54' and 55' defining a portion of the side walls of the recess 21. The gates 53 also include blades or vane portions 56 and 57 which project from the opposite sides thereof in opposite directions. The arcuate recess portion 54' extends to a straight wall portion 58 that forms a stop or abutment for the heel portion 59 of the blade 56. On the other hand, the opposite wall portion 55' of the recess 21 includes a notched portion 60 that is complemental in shape to the projecting end of the blade 56. Likewise, the recess 31 of the rotor section 16 includes a stop or abutment surface 61 adapted to be engaged by the heel 62 of the vane 57 and a notched portion 63 that is complemental in shape to the projecting end of the blade 57.

One of the gates 53 is illustrated in perspective in Fig. 7 wherefrom it will be noted that each gate 53 also includes a shaft portion 64 that is received in the complementary cavities 24 and 30 formed in the rotor sections 15 and 16, respectively. The shaft portion 64, thus, provides a pivotal support for limited rotary movement of the gate 53 with respect to the rotor 14. A block portion 65 is carried by the inner end of the shaft 64 and the inner surface thereof is generally arcuate and conforms to the contour of the outer periphery of the cam 36 but is radially spaced therefrom. The block portion 65 carries a stud 66 upon which a ball bearing follower roller 67 is mounted. The follower roller 67 projects into a groove 68 extending around the entire periphery of the cam 36. The cam groove 68 includes diametrically opposite curved portions or "rises" 69 for effecting pivotal movement of the gates 53 relative to the rotor 14 as the rotor turns and carries the follower rollers 67 through the cam groove 68 of the stationary cam 36. This cam action, and the purpose thereof, will be described in greater detail later.

The gates 53, shaft portions 64 and block portions 65 may be formed as an integral casting or consist of separate pieces suitably secured together. In any event, the heel portions 59 and 62 lie upon a diametrical line passing through the axis of the shaft portion 64.

Referring now to Fig. 9, the housing end section 3 has two arcuate grooves or working chambers 70 and 71 formed in the inner face thereof. These chambers have inner and outer radii corresponding to that of the vanes 57 of the gates 53, and are adapted to receive said vanes therein with suitable side clearance. The adjacent ends of the chambers 70 and 71 are separated by dams or abutment portions 72 and 73 which include a surface that lies flush with the inner face of the housing section. An inlet opening 74 is located adjacent one end of the chamber 70 and has a conventional pipe fitting 75 mounted therein. An exhaust port 76 is located at the opposite end of the chamber 70 and establishes communication between said chamber and the exterior of the housing section 3. A similar inlet opening 77 is located at one end of the chamber 71 and has a conventional fitting 78 mounted therein and a similar exhaust port 79 is located at the opposite end of said chamber and adjacent the abutment 73. As is best shown in Figs. 3 and 9A, the housing section 4 has similar working chambers 80 and 81 separated by abutments 82 and 83. These chambers are adapted to receive the blades 56. An inlet opening 84 having a conventional fitting 85 mounted therein is located at one end of the chamber 80 and an exhaust port 86 is located at the opposite end thereof adjacent the abutment 82. An inlet opening 87 having a conventional pipe fitting 88 mounted therein is located at one end of the chamber 81 and an exhaust port 89 is located at the opposite end of said chamber adjacent the abutment 83. Of course, the chambers 70 and 71 are formed on the same radius as the chambers 80 and 81 and are disposed in confronting relation to each other at opposite sides of the chamber C.

The cam groove 68 controls the position of the gates 53 at all times so that when operating fluid (preferably oil under pressure) acts upon the blades, adequate torque is developed to positively turn the rotor 14. The openings 74 and 77 constitute means for admitting operating fluid under pressure into the chambers 70 and 71, respectively, through the housing end plate 3, and the openings 84 and 87 constitute means for admitting operating fluid under pressure into the chambers 80 and 81 through the housing end plate 4, depending upon the direction in which it is desired to drive the rotor 14. In the unit illustrated herein, operating fluid admitted into the openings 84 and 87 will drive the rotor 14 in one direction, forward, whereas the admission of operating fluid into the openings 74 and 77 will drive the rotor in the opposite direction, reverse.

When the unit 1 is used as a transmission (or as a motor) it is preferably mounted within a casing 90 including a detachable cover 91 (Fig. 14). The housing of the unit 1 is mounted within the casing 90 on a saddle 92 and the saddle is suitable secured to the bottom 93 of said casing to prevent the housing from turning relative to said casing. The direction control means for the unit 1 is diagrammatically illustrated and generally identified by the numeral 94 and comprises a fluid distribution valve V. The valve V is preferably disposed within the casing 90 and includes a housing comprising a main body portion 95 mounted upon a side wall of said casing by means of cap screws 96. The body 95 is generally U-shaped in transverse cross section, as will be apparent from Fig. 17, and includes outwardly extending flanges 97 that form supports for an intermediate body portion or flat plate 98, shown in perspective in Fig. 19. The housing of the valve V further includes a guide portion or cover 99 that is also generally U-shaped in transverse cross section, as illustrated in Fig. 20, but much shallower than the main body 95. The guide 99 also includes laterally extending flanges 100 similar to the flanges 97. The flanges 97 are provided with threaded openings, and the plate 98 and flanges 100 are provided with plain openings that are adapted to register and receive screws 101 for securing the valve body parts 95, 98 and 99 in assembled relation.

The body 95 has a base portion 102 that directly engages the side wall of the casing 90 and is provided with a central opening 103 that serves as an inlet for operating fluid (for example a light oil) for driving the unit 1.

The body 95 also includes side walls 104 that interconnect the bottom wall 102 with the flanges 97. The bottom wall 102, the side walls 104 and the plate 98 cooperate to provide an elongated chamber 105 of rectangular cross section in which a forward and reverse control valve member or element 106 is slidably mounted. The valve element 106 is illustrated in perspective in Fig. 18 and includes a hollow rectangular portion 107 of dimensions corresponding to that of the cross-section of the chamber 105. Flanges 108 extend in opposite directions from the end of the rectangular portion 107 and are engaged with the inner surface of the wall 102. A shouldered stud 109 is mounted upon one of said flanges and an operating rod 110 is pivotally connected thereto and extends through an opening 111 in the cover 91. One of the side walls 104 has cap screws 112 mounted thereon with their heads projecting inwardly from the inner side thereof and adapted to serve as stops to limit the travel of the valve element 106 relative to the body 95.

The hollow rectangular portion of the valve element 106 defines a chamber 113 of corresponding shape that is closed at the end thereof remote from the wall 102 by a wall 114 that is in sliding engagement with one face of the plate 98. The wall 114 has an elongated opening 115 therein equal to the length of the chamber 113, but of less width, as best illustrated in Fig. 18. The chamber 113 is always in communication with the inlet opening 103 of the valve and the stops 112 are positioned so that, irrespective of the position of the valve element 106, the chamber 113 is always in registration with the inlet opening 103.

The plate 98 has longitudinally spaced ports 116 and 117 extending therethrough. The port 116 serves to admit operating fluid into the unit 1 to drive the same in a forward direction and the port 117 serves to admit operating fluid into the unit 1 to drive the unit in a reverse direction, all as will be explained later. The length of the elongated port 115 is such that when the valve element 106 is in its truly intermediate position, it partially overlaps both of the ports 116 and 117, as shown in Figs. 15 and 16, so that operating fluid can be simultaneously admitted to the unit 1 through the ports 116 and 117 to balance the pressures within the housing tending to rotate the rotor 14 to thereby lock the rotor against turning, and thus avoid a condition of "creep," which is a common fault in present day vehicle drives, including fluid couplings and torque converters.

The guide member 99 is provided with openings 118 and 119, Fig. 14, spaced the same distance apart as the ports 116 and 117. A conventional pipe nipple 120 is mounted in the opening 118 and has the stem of a Y-fitting 121 connected thereto.

A conduit 122 connects one branch of the Y-fitting 121 to an elbow 123 mounted upon the fitting 85 and another conduit 124 connects the other branch of said Y-fitting to an elbow 125 mounted upon the fitting 88. The other opening 119 has a similar pipe nipple 126 mounted therein and the stem of a Y-fitting 127 mounted thereon. A conduit 128 connects one branch of the Y-fitting 127 to an elbow 129 connected to the pipe nipple 75 and another conduit 130 connects the other branch of said Y-fitting to an elbow 131 mounted upon the pipe nipple 78. Thus, the conduits 122 and 124 establish communication between the opening 118 and the working chambers 81 and 80 respectively, and the conduits 128 and 130 establish communication between the opening 119 and the working chambers 71 and 70, respectively.

The guide member 99 cooperates with the plates 98 to provide a space 135 therebetween adapted to receive a slide valve element 136 in the form of a flat plate, as illustrated in Fig. 14. The side valve element 136, see Fig. 21, has a circular port 137 and an elongated port 138 extending therethrough. The spacing of the ports 137 and 138 is such that when the port 137 is in registration with the port 117, the upper end of the port 138 is in registration with the port 116. The slide valve element 136 also has a lug 139 projecting from the upper end thereof and one end of a control rod 140 is connected thereto and extends through an opening 141 in the casing cover 91. The purpose of the slide valve 136 is to control the unit 1 in a manner to cause the same to operate as a brake, all as will be explained later.

The casing 90 forms a reservoir or sump for the operating fluid, preferably a good grade of lubricating oil, indicated at 145. A conventional pump 146, adapted to be driven by a vehicle engine or other means (not shown) has its inlet side 147 connected with the lower portion of the casing 90 by a pipe 148. The outlet 149 of the pump 146 is connected to one end of a pipe 150 and the opposite end thereof is connected to a fitting 151 mounted in the side wall of the casing 90 and communicating with the inlet port 103 of the valve body 102. A manually operable three-way valve 152 is connected in the pipe 150 between the pump 146 and the fitting 151. The pump 146 is preferably of the type that has a built-in by-pass, so that oil can be by-passed instead of being delivered into the pipe 150 in the event that excess pressure is developed in said pipe.

The oil 145 within the casing 90 is, of course, under atmospheric pressure so that spent operating fluid can be readily discharged from the exhaust ports 76 and 79, or 86 and 89 and collect within the casing 90. While the pump 146 has been shown outside the casing 90, it is to be understood that it may be mounted within said casing, if desired.

The rate at which operating fluid is supplied to the unit 1 is controlled by the valve 152. Hence, the valve 152 is operable to control the speed of the unit 1. The valve 152 is of the rotary type and is actuated by a lever 153 having an operating rod 154 connected thereto. The lever 153 is connected with a core 155 disposed in the body of the valve 152, said core having a diametrically extending through-port 156 and a radial port 157 disposed perpendicularly thereto and intersecting the same. The diametrical port 156 controls the rate of flow of operating fluid through the valve 152, when the valve core 155 is in the position illustrated in Fig. 14; whereas, the ports 156 and 157 jointly serve to by-pass the operating fluid when the core 155 is rotated clockwise through an angle of 90 degrees from the position thereof illustrated in Fig. 14. At such latter time, one end of the port 156 communicates with an opening 158 in the body of the valve 152 and a by-pass conduit 159 conducts the fluid from said opening back to the casing 90. Thus, any adjustment of the port 156 from a true horizontal position will restrict the volume of flow of operating fluid to the unit 1, and in this way the speed of the unit 1 can readily be regulated in either forward or reverse drive. It will be understood, of course, that upon rotation of the valve core 155 in a direction counter-clockwise from that illustrated in Fig. 14 to a position in which the port 156 is vertical, complete obstruction of fluid flow through the pipe 150 will be effected.

Fig. 6 illustrates the relative position of the vanes 56 and 57 when operating fluid under pressure is being supplied to the chambers 80 and 81 to drive the rotor 14 in a forward direction. That is to say, when the valve element 106 is in the position shown in Fig. 14 with the port 115 in registration only with the port 116. It will be noted that the stop surfaces 58 and 61 are engaged by the heel portions 59 and 62 of the blades 56 and 57, respectively, and serve to limit rotary movement of said blades so that they do not engage the bottom wall of their associated working chambers with undue pressure. The shape of the cam groove 68 is such that when the straight walls thereof are engaged with the follower rollers 67 the free ends of the blades 56 and 57 of the gates 53 associated therewith are positioned in sealing engagement with the bottom and side walls of the chambers 80—81. With the blades 56 and 57 in such position, the operating fluid is effective upon the blades 56 to cause the rotor 14 to turn clockwise as viewed in Fig. 7. The blades of diametrically opposed gates 53 remain in their extended active position until the follower rollers 67 thereof are moved into engagement with the curved portions 69 of the cam groove 68, whereupon they are positively retracted by said cam groove to enable the same to pass the abutments 82—83, and 72—73, although the flat side of the blades remains in contact with the faces of said abutments to form a seal therewith as they move across the same, as illustrated in Fig. 5. The shape of the cam groove 68 is such that the respective blades are held in their advanced position until they closely approach the abutments between the working chambers, whereupon they are quickly retracted to clear said abutments, and then advanced again as soon as they have passed the abutments. In the particular unit disclosed herein, the blades are retracted twice during each revolution of the rotor 14. Moreover, the abutments 72—73 are circumferentially offset from the abutments 82—83 a distance equal to the length of the face of the blades 56 and 57, as best shown in Fig. 5. This relation exists by virtue of the fact that the heels 59 and 62 of the blades 56 and 57, respectively, lie upon a diametrical line, as previously noted.

The tips of the blades 56 and 57 travel through a distance equal to the depth of the working chambers 80—81 and 70—71 associated therewith. Hence, the gates 53 are required to only rotate through a very small angle. It is to be understood that, while the gates 53 are arcuate in a circumferential direction, sufficient clearance is provided between the rotor 14, said gates and the housing parts to permit the necessary pivotal movement without any binding. The clearances required are small and, therefore, no attempt has been made to illustrate the same in the drawings.

The clearance between the arcuate portions 54 and 55 of the gates 53 and the adjacent portion 54' and 55' of the rotor 14 is such that a seal is formed therebetween to prevent leakage. Also the gates engage said abutments and substantially relieve the shearing stress upon the shaft portions 64 thereof. Of course, this is conducive to a maximum of efficiency in operation and a minimum of wear between the gates 53 and the rotor 14 and between the shaft portions 64 and the arcuate recesses 24 and 30 serve as a journal therefor.

Since operating fluid under pressure for forward drive is admitted at the two diametrically opposed inlet openings 84 and 87, a very uniform and powerful torque is imparted to the rotor 14, which, in turn, transmits the same to the shaft 44. Four gates or sets of blades are shown in the present unit so that operating fluid will be effective upon at least two of the blades 56 during forward drive even at a time when the remaining two blades 56 are passing across the abutments 82 and 83. It is to be understood, however, that any suitable number of gates in excess of four may be mounted upon the rotor, depending upon its size, etc. The close fit of the working parts makes it possible to operate the unit 1 with a very high efficiency at comparatively low pressures. When the present unit is used as a transmission in a motor vehicle, for example, speeds of 70 miles an hour and higher can be readily obtained with pressures under 200 pounds per square inch.

Another advantage obtained with the present unit, when using the same as a transmission, is that no slip occurs in the drive, so that immediately upon the admission of operating fluid into the unit 1, positive rotation of the rotor 14 and shaft 44 occurs. A further advantage resides in the fact that the valve member 106 can be adjusted to the intermediate position illustrated in Fig. 15, wherein some fluid is available to simultaneously act upon the blades in both sets of working chambers 80—81 and 70—71, at the opposite sides of the unit 1 to thus lock the rotor 14 against rotation and thereby avoid annoying "creep" at times when the vehicle is to remain stationary, without requiring the operator to apply the usual foot brake. Ordinarily, the valve member 106 is disposed in a position in which it engages one or the other of the stops 112.

While the clearance between the periphery of the intermediate housing section 2 and the periphery of the rotor 14 has been described as very slight, or only sufficient to provide for adequate lubrication, it will be apparent that no ill effects or detrimental action will occur in the event that any of the oil should leak between the rotor 14 and the housing section 2, since the exhaust ports 76—79 and 86—89 will drain slight leakage, and the conduits 128 and 130 are open to exhaust at the time that operating fluid under pressure is being delivered to the unit 1 through the conduits 122 and 124 for forward drive.

Assuming, as has been hereinbefore indicated, that the delivery of operating fluid through the conduits 122 and 124 effects forward drive of the vehicle, then, it will be apparent that upon shifting of the valve member 106 to its other extreme position, the direction of flow of operating fluid to the unit 1 will be reversed. That is to say, upon shifting of the valve member 106 upwardly to connect the conduits 128 and 130 to high pressure and the conduits 122 and 124 to exhaust, the rotor 14 will be caused to rotate in a reverse direction in view of the reverse direction of pressure of the fluid acting on the gates 53. Specifically, the fluid pressure will now be effective in the chambers 70 and 71 to act upon the blade portions 57 to cause the rotor 14 to turn in the reverse direction. It will be understood that the same cam grove 68 will then positively control the blades 57 in the same manner described in connection with the control of the blades 56 during forward drive. It will also be apparent that forward or reverse drive can be maintained at any desired speed by manipulating the lever 153 of the valve 152 to control the rate at which operating fluid is supplied to the unit 1.

While the unit 1 has been described in detail as either a vehicle transmission or motor, it further possesses the desirable feature of being able to function as an independent brake, by connecting the rotor shaft 44 to the part whose rotation is to be retarded or controlled, or used to brake the shaft 44 itself which it is otherwise capable of driving. The control or the extent of braking effect obtained will vary in accordance with the adjustment of the plate valve 136. In Fig. 14, the valve 136 is illustrated in its inactive position, that is to say, a position in which it exerts no effect on the operating fluid whatever. This is apparent from the fact that the ports 137 and 138 of the slide valve 136 are in full registry with the ports 116 and 117, respectively, of the plate 98.

Assuming that the shaft 44 is connected with a vehicle propeller shaft whose rotation it is desired to retard, and assuming further that the shaft 44 normally rotates in a clockwise direction, as viewed in Fig. 3, then a braking effect can be applied to the shaft 44 while the valve member 106 is positioned for forward drive, as shown in Fig. 14. This result can be obtained by raising the slide valve 136. Thus, bearing in mind that the unit 1 is submerged in the oil 145 in the casing 90 and that the oil can enter the chambers 70 and 71 by gravity through the exhaust passages 76 and 79, respectively, this oil must be forced out of said chambers by backing the same through the conduits 128 and 130 for discharge back into the casing 90 through the port 117. So long as the slide valve 136 remains in a position with its port 137 in full registration with the port 117, substantially no resistance to backing out of the oil is offered thereby, and, hence, no substantial retardation of rotation of the rotor takes place. But, upon moving of the slide valve 136 upwardly so that the port 137 is only in partial registration with the port 117, the return flow of the oil is obstructed and a braking action is applied to the rotor 14. While the port 137 is being moved out of registration with the port 117, flow through the port 116 to the unit 1 is not obstructed by the slide valve 136 since the elongated port 138 thereof remains in registration with the port 116. Thus, the braking effect can be varied as desired by adjusting the slide valve 136 by manipulating the rod 140. This construction makes it possible to leave the valve member 106 in forward drive position and to effect self-braking of the unit 1 to any degree desired, simply by operating the slide valve 136 through the rod 140.

It will be understood that various changes may be made in the details of construction and configuration of the parts of the unit disclosed herein without departing from the principles of the invention or the scope of the annexed claims.

I claim:

1. A rotor comprising a pair of circular sections disposed in confronting relation, at least one of said rotor sections having cavity means providing a chamber; a cylindrical cam disposed in said cavity means; a first shaft connected to one of said rotor sections; a second shaft connected to said cylindrical cam and extending through the other rotor section in axial alignment with said first shaft, said cam having a groove formed in the outer periphery thereof, said rotor sections having radial recesses formed in the periphery thereof, a gate member received in each recess, each gate member including an inwardly extending shaft pivotally mounted in a portion of its associated recess; and a cam follower carried by the inner end of each shaft with the follower received in the groove of said cam.

2. A rotor as defined in claim 1, wherein the end of the cylindrical cam is counterbored and contains a bearing, and a portion of the rotor section concentric with the innermost end of said first shaft is supported in said bearing.

3. A fluid actuated device, comprising: a housing having a rotor chamber therein, said housing having a hub portion projecting outwardly therefrom on opposite sides thereof; a first shaft rotatably mounted in one of said hub portions and extending into said chamber; a rotor in said chamber fixed to said first shaft, said rotor having a cavity formed in the interior thereof; a cylindrical cam disposed in said cavity and provided with a cam groove; a second shaft fixed to said cam and extending from said rotor into the other hub portion of said housing; means securing said second shaft against rotation relative to said housing, whereby to maintain said cam stationary, said rotor having a plurality of recesses formed in the periphery thereof, said housing having chambers for operating fluid, a gate pivotally mounted in each recess and including blades moveable relative to said last-mentioned chambers and adapted to be subjected to the pressure of operating fluid for effecting rotation of said rotor; and means including a cam follower received in said cam groove for controlling the angular position of said gates relative to the periphery of said rotor.

4. A fluid actuated device comprising, a housing; a reversible vaned rotor in said housing, said housing having separate chambers for receiving operating fluid for driving said rotor in opposite directions; means for supplying operating fluid to said device to cause rotation of said rotor; means for controlling the flow of operating fluid to said chambers of said device and operable to simultaneously admit operating fluid to all of said chambers; and means operable independently of said last-mentioned means for modifying the flow of operating fluid to at least certain of said chambers.

5. A fluid actuated device comprising a housing; a reversible vaned rotor in said housing, said housing having separate chambers for receiving operating fluid for driving said rotor in opposite directions; means for supplying operating fluid to said device to cause rotation of said rotor; means for controlling the flow of operating fluid to said chambers including a ported valve body and a slidable valve element operable to selectively admit operating fluid to certain of said chambers to effect forward or reverse drive of said rotor, or to simultaneously admit operating fluid to all of said chambers to lock said rotor against rotation.

6. A fluid actuated device, comprising: a housing; a reversible vaned rotor in said housing, said housing having separate chambers for receiving operating fluid for driving said rotor in opposite directions; means for supplying operating fluid to said device to cause rotation of said rotor; means for controlling the flow of operating fluid to said chambers including a ported valve body and a slidable valve element operable to selectively admit operating fluid to certain of said chambers to effect forward or reverse drive of said rotor, or to simultaneously admit operating fluid to all of said chambers to lock said rotor against rotation; and means including a second slidable valve element operable independently of said first-mentioned valve element for modifying the flow of operating fluid to at least certain of said chambers.

7. A fluid actuated device, comprising: an annular housing section; an end housing section on opposite sides of said annular housing section and cooperating therewith to form a rotor chamber; means extending through said sections and securing the same together, each of said end housing sections having a hub portion projecting outwardly therefrom; a shaft rotatably mounted in one of said hub portions and extending into said chamber; a rotor in said chamber fixed to said shaft, said rotor having side faces confronting the inner faces of said end housing sections with only close operating clearance therebetween, said rotor having a peripheral portion having only operating clearance with the inner surface of said annular housing section; blades pivotally mounted in recesses formed in the periphery of said rotor, said end housing sections having portions of the internal surface thereof removed to provide working chambers for said blades; means for admitting operating fluid under pressure into said working chambers; and means positively controlling the pivotal movement of said blades relative to said rotor and working chambers as said rotor rotates, said means including a stationary shaft fixed to said housing and extending into a cavity in said rotor in axial alignment with said rotatably mounted shaft, a cam concentric with said rotor mounted on said stationary shaft in said rotor cavity, and cam followers connected to said pivotally mounted blades.

8. A fluid actuated device as defined in claim 7, in which the blades on the one side of the rotor extend in one direction and the blades on the opopsite side of the rotor extend in the opposite direction and the operating fluid is selectively admissible to act on the blades at either side of said rotor, whereby the device is rendered reversible.

9. In a hydraulic power transmission system operated by fluid under pressure, a casing; a power transmission unit mounted within said casing, said unit including a housing; a shaft extending through said casing and into the housing of said power transmission unit; a rotor secured to said shaft and located within the housing of said power transmission unit; gates mounted upon the periphery of said rotor and including baldes disposed at opposite sides of said rotor, said housing having working chambers for said blades and inlet openings for admitting operating fluid into said chambers to act upon the blades at either side of said rotor and exhaust ports for exhausting spent operating fluid from said chambers; a fluid distribution valve having an inlet port supplying operating fluid from the outside of said casing, said valve having port means adapted to be placed in communication with the inlet openings at the opposite sides of said housing; and a ported member in said valve to selectively admit operating fluid to certain of said chambers to effect forward or reverse drive of said rotor or to simultaneously admit operating fluid to all of said chambers to lock said rotor against rotation.

10. In a hydraulic power transmission system operated by fluid under pressure, a casing; a reversible power transmission unit mounted within said casing, said unit including a housing; a shaft extending through said casing and into the housing of said power transmission unit; a rotor secured to said shaft and located within the housing of said power transmission unit; gates mounted upon the periphery of said rotor and including blades disposed at opposite sides of said rotor with the blades at one side of the rotor extending in a direction opposite to that of the blades at the opposite side of the rotor, said housing having working chambers for said blades and inlet openings for admitting operating fluid into said chambers to act upon the blades at either side of said rotor and exhaust passages for exhasting spent operating fluid from said chambers; a fluid distribution valve mounted within said casing and having an inlet port supplying operating fluid from the outside of said casing, said valve having ports adapted to be selectively placed in communication with the inlet openings at the opposite side of said housing and a ported member in said valve for selectively directing the flow of operating fluid to the inlet ports at one side or the other of said housing to effect either forward or reverse drive of said rotor or to admit fluid simultaneously to said inlet ports at both sides of the rotor to lock said rotor against rotation.

11. A hydraulic transmission system as defined in claim 10, in which the housing exhaust passages discharge spent operating fluid directly into the casing.

12. A fluid-actuated device, comprising: a housing having a centrally positioned rotor chamber; a compact rotor positioned in said chamber and having extending hub portions on each side thereof journaled within said housing and thereby supporting said rotor for free rotation in said chamber, said rotor unit substantially filling said chamber with all exterior surfaces of said rotor and interior surfaces of said housing forming the rotor chamber being in confronting relationship with only close operating clearance therebetween, said rotor having a plurality of recesses extending inwardly from the periphery thereof and said housing having arcuate portions removed from the interior thereof on each side of the peripheral portion of said rotor adjacent the recessed portions of the rotor to thereby provide working chambers for operating fluid; a radially extending shaft rotatably journaled in a portion of each of said recesses; a gate in each recess mounted on the outer end of the shaft associated with the recess and adapted to be pivotally moved by the rotation of said shaft into the chambers for operating fluid; said rotor having a cavity formed therein and an axial bore communicating with said cavity; a stationary shaft fixed to said housing and extending through said axial bore into said cavity; a stationary cam in said cavity concentric with said rotor and carried by said stationary shaft; a cam follower on the inner end of each of the shafts journaled in the rotor recesses, said cam and cam followers being in operating engagement and co-operating to control the movement of said gates into and out of the working chambers during the rotation of said rotor; means for introducing operating fluid to and for discharging operating fluid from said working chambers; and a shaft extending through said housing and fixed to said rotor in axial alignment with and on the opposite side of said rotor from said stationary shaft.

(References on following page)

References Cited in the file of this patent

UNITED STATES PATENTS

| | | |
|---|---|---|
| 375,788 | Williamson | Jan. 3, 1888 |
| 415,954 | Williamson | Nov. 26, 1889 |
| 510,600 | Hochhausen | Dec. 12, 1893 |
| 713,633 | Mills | Nov. 18, 1902 |
| 747,026 | Willis | Dec. 15, 1903 |
| 775,632 | Norden | Nov. 22, 1904 |
| 1,036,119 | Hughes | Aug. 20, 1912 |
| 1,061,452 | Condit | May 13, 1913 |
| 1,138,481 | Hupe | May 4, 1915 |
| 1,288,547 | Fifield | Dec. 24, 1918 |
| 1,615,341 | Murray | Jan. 25, 1927 |
| 1,999,339 | Morgan | Apr. 30, 1935 |